United States Patent [19]

Svensson

[11] Patent Number: 5,190,393
[45] Date of Patent: Mar. 2, 1993

[54] DEVICE AT EXPANDABLE MOUNTING SLEEVE

[76] Inventor: Roger Svensson, Box 271, S-597 00 Atvidaberg, Sweden

[21] Appl. No.: 613,555
[22] PCT Filed: May 25, 1989
[86] PCT No.: PCT/SE89/00296
  § 371 Date: Jan. 7, 1991
  § 102(e) Date: Jan. 7, 1991
[87] PCT Pub. No.: WO89/11598
  PCT Pub. Date: Nov. 30, 1989

[51] Int. Cl.[5] .............................. F16B 7/04
[52] U.S. Cl. ................... 403/370; 403/259; 403/16
[58] Field of Search ............... 403/371, 370, 369, 367, 403/16, 257-261

[56] References Cited

U.S. PATENT DOCUMENTS

| | | | |
|---|---|---|---|
| 1,561,507 | 11/1925 | Clark | 403/371 |
| 2,381,697 | 8/1945 | Shepard | 403/16 |
| 3,727,957 | 4/1973 | Brown et al. | 403/370 X |
| 4,304,502 | 12/1981 | Stratienko | 403/370 |
| 4,615,640 | 10/1986 | Hosokawa | 403/370 X |

FOREIGN PATENT DOCUMENTS

| | | |
|---|---|---|
| 3444608 | 5/1987 | Fed. Rep. of Germany . |
| 1393490 | 2/1965 | France . |
| 442429 | 12/1985 | Sweden . |
| 442661 | 1/1986 | Sweden . |
| 254047 | 12/1948 | Switzerland ............ 403/370 |

Primary Examiner—Peter M. Cuomo
Attorney, Agent, or Firm—Paul A. Fattibene; Arthur T. Fattibene

[57] ABSTRACT

The invention concerns expandable fastenings of the kind that includes a conical shaft part (2) and a conical expandable sleeve (4) that is pressed up on the conical part (2) of the shaft (1) in order to fill out and fasten the shaft in a mounting hole. The expandable sleeve (4) is pressed against the cone by a washer (5) and by a nut (11) screwed onto a threaded end portion of the shaft. The washer (5) is on its outside provided with a thread for the threading thereon of a nut part or sealing ring (6). The expandable sleeve (4) and the threaded washer (5) are connected by hooklike flanges so that the sealing ring (6) can also be used to pull out the sleeve from the conical axle part.

12 Claims, 1 Drawing Sheet

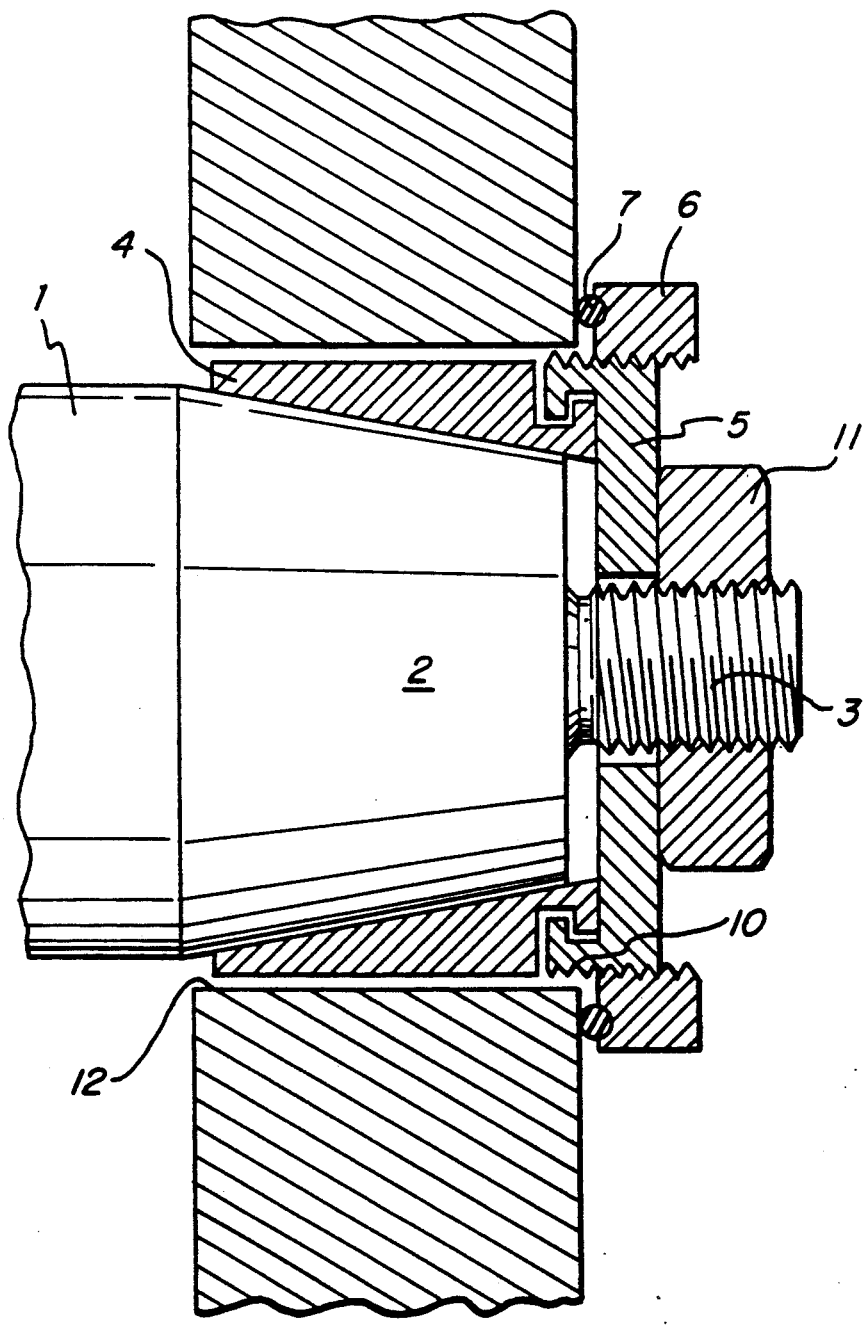

DEVICE AT EXPANDABLE MOUNTING SLEEVE

BACKGROUND OF THE INVENTION

This invention related to expandable fastening means in particular stub axles and shafts. By using expandable means a very rigid fastening is obtained that is unlikely to losen. Sooner or later however the fastening means must be losened in order to exchange the bearings carried by the shaft. This is however not fully as simple as it sounds. To start with there is always the risk, with the embodiments existing today, that dirt enters into the fastening as well as water, and corrosion and pollution result in that the expandable element will stick so hard that it will become close to impossible to loosen and remove the shaft. The result is often that excessive force is used, which in turn can make the reassembly of the mounting impossible, difficult or expensive, due to damages on the shaft itself or the fastening brackets.

SUMMARY OF THE INVENTION

In view of the above problems an object of the invention is to provide improved sealing for shafts fastened with expandable elements and the like. Another object of the invention is to faciliate nondestructive disassembly.

BRIEF DESCRIPTION OF THE DRAWING

The FIGURE is a longitudinal sectional view of the device according to the invention. Further advantages and features of the invention are readily apparent from the following description of a preferred embodiment.

DETAILED DESCRIPTION OF THE PREFERRED EMBODIMENT

On the drawing one end of a shaft 1 is shown. The shaft is mounted in two brackets of which only one is shown. On the shaft a bearing is arranged. The resulting joint can be used to connect pivotable arms, pistons, piston rods etc.

The shaft 1 has in its outer end a conically tapering part 2 and outside of this a threaded part 3. Between the shaft 1 and the essentially cylindrical hole in the bracket is arranged a sleeve 4 with wedge-like longitudinal section. The tapering of the conical part 2 of the shaft 1 and the sleeve 4 coincide, and the sleeve 4 is provided with slots extending from alternating ends of it so that the sleeve is easily expandable. In this way the sleeve 4 can be expanded by a forcing the sleeve 4 onto the conical part 2 of the shaft so that the hole 12 is filled up and a secure fixing is obtained for the shaft 1. In order to push the sleeve 4 against the conical part 2 of the shaft a washer 5 is arranged to be pushed over the outer threaded part 3 of the shaft and with an outer diameter less the hole 12 for the fastening of a joint. The washer 5 is pressed against the sleeve 4 by a nut 11 threaded on the threaded part 3.

The washer 5 has at its outer circumference a thread 10 on which after mounting a sealing and demounting ring 6 is threaded. The side towards the bracket is provided with an O-ring or seal 7. In this way it is certain that no dirt whatsoever can enter into the expanding parts. As a result hereof no pollution or corrosion takes place and the parts become easier to demount. Within the concept of the invention it is of course also possible to consider a sealing ring 6 constituted by a domed nut also protecting the nut and threaded part of the shaft.

In order further to facilitate demounting or disassembly of the expandable device the sleeve 4 and the washer 5 are connected gripping into each other with hooklike circumferencial protrusions or blunges. For the sleeve 4 these protrusions are turned inwards and for the washer 5 turned outwards. Preferably the cooperating gripping surfaces are slightly iclined with the apex of the corresponding cone turned towards the axle 1. In this way at demounting the nut 11 is first removed and then the sealing ring 6 is unscrewed and again treaded on the washer 5 with the seal 7 turned outwards. The turning of the ring 6 then pulls the washer 5 outwards together with the expandable element 4. The ring 6 is preferably provided with an outer key grip.

Within the frame of the invention it is also possible to consider the nut 11 and washer 5 integrated with each other, for which case the washer 5 is preferably turnable relative the sleeve 4. In case that the washer 5 does not have any key grip however it is preferably fixed in a turnable direction relative to the sleeve 4 so that the fastened sleeve 4 holds the washer 5 against rotation when the ring 6 is turned in order to pull the sleeve 4 outwards.

Instead of the above hooking of sleeve 4 and washer 5 it is of course also possible to consider bajonet grip.

The expandable fastening is in particular intended for the use in heavy machinery to connect piston rods and pistons pivotably with two opposed identical fastenings of the type described. By means of the invention the holes in the mounting brackets can be big enough to allow the shaft 1 to be entered through the holes. Furthermore each end of the shaft is mounted independently and the two fastening brackets will not be subjected to any contracting pressure against each other. Since no pretension prevails the resistance against tension for the total device will be better than otherwise.

Between the two brackets the bearing of the pivotable parts will be arranged and the so to say inner side of the fastenings will be subjected to a constant presence of lubricants under pressure. In order to prevent this lubricant from seeping away from the fastening means to the outside sealing ring 6 and seal 7 cooperate to keep the lubricant where it should be, including the protection of the sleeve 4 and the surfaces of hole and shaft.

When sealing the fastening it is of course not permitted to subject ring 6 to so great turning toques that the washer 5 is deformed and the sleeve 4 is subjected to removable pressures.

It is of course also possible to arrange a threaded hole in the shaft 2 and use a bolt instead of a threaded part 3 and nut 11.

I claim:

1. An expandable device for attaching a shaft to a hub comprising:
    a shaft having a truncated conical end;
    an expandable sleeve having an inner conical surface mating with the truncated conical end and an exterior surface mating with a mounting hole in the hub;
    a threaded washer having a threaded outer surface and adapted to rotatably interconnect with one end of said expandable sleeve;
    a threaded part extending axially from said truncated conical end of said shaft and through said treaded washer;

a nut mounted on said threaded part and threaded to engage said threaded washer, said nut having an outer diameter smaller than said outer surface of said threaded washer; and an internally threaded ring adapted to be threaded onto said outer surface of said threaded washer and engageing said hub.

2. Device according to claim 1, characterized in that the expandable sleeve and the threaded washer are connected by cooperating gripping surfaces allowing relative movement axially so that the expansion of the sleeve is not hindered.

3. Device according to claim 2, characterized in that the threaded washer and the expandable sleeve are freely rotatable relative to each other.

4. Device according to claim 2, characterized in that the threaded washer and the expandable sleeve are locked relative to each other against the rotation.

5. Device according to claim 2, characterized in that an outer diameter of the threaded washer is less than an inner diameter of the mounting hole.

6. Device according to claim 1, characterized in that the threaded washer and the expandable sleeve are freely rotatable relative to each other.

7. Device according to claim 6, characterized in that an outer diameter of the threaded washer is less than an inner diameter of the mounting hole.

8. Device according to claim 1 characterized in that the threaded washer and the expandable sleeve are locked relative to each other against rotation.

9. Device according to claim 8, characterized in that an outer diameter of the threaded washer is less than an inner diameter of the mounting hole.

10. An expanding device as in claim 9 wherein:
the threaded outer periphery of said washer has a diameter less than that of the hole in the hub.

11. Device according to claim 1 characterized in that an outer diameter of the threaded washer is less than an inner diameter of the mounting hole.

12. An expandable device for attaching a shaft to a hub comprising:
a shaft, said shaft having a truncated conical end;
an expandable sleeve circumscribing the truncated conical end and having an internal inclined surface mating with the truncated conical end and an exterior surface mating with a hole in the hub;
a washer having a threaded outer periphery and adapted to rotatably interconnect with one end of said expandable sleeve;
a threaded part attached to said shaft and extending axially from the truncated conical end axially through said washer;
a nut adapted to receive said threaded part and contact said washer, said nut having an outer diameter smaller than said outer periphery of said washer; and
a sealing ring adapted to be threaded onto the outer periphery of said washer and engaging said hub,
whereby said sealing ring prevents dirt and contamination from entering to the shaft and additionally facilitates disassembly of the expanding device.

* * * * *